United States Patent [19]

Ohashi et al.

[11] Patent Number: 5,761,309
[45] Date of Patent: Jun. 2, 1998

[54] AUTHENTICATION SYSTEM

[75] Inventors: Masayoshi Ohashi, Saitama; Toshinori Suzuki, Tokyo, both of Japan

[73] Assignee: Kokusai Denshin Denwa Co., Ltd., Tokyo, Japan

[21] Appl. No.: 619,518

[22] PCT Filed: Aug. 29, 1995

[86] PCT No.: PCT/JP95/01708

§ 371 Date: Apr. 26, 1996

§ 102(e) Date: Apr. 26, 1996

[87] PCT Pub. No.: WO96/07256

PCT Pub. Date: Mar. 7, 1996

[30] Foreign Application Priority Data

Aug. 30, 1994 [JP] Japan ................. 6-227414

[51] Int. Cl.$^6$ ........................................ H04L 9/32
[52] U.S. Cl. ............................... 380/25; 380/23
[58] Field of Search ......................... 380/25, 4, 23

[56] References Cited

U.S. PATENT DOCUMENTS 5,349,643  9/1994  Cox et al. ................. 380/25
5,495,533  2/1996  Linehan et al. ............ 380/21

FOREIGN PATENT DOCUMENTS 63-294152  11/1988  Japan.
2-4018     1/1990   Japan.
5-333775   12/1993  Japan.

OTHER PUBLICATIONS

IEICE Technical Research Report, CS94–107, Sep. 1, 1994, pp. 105–110.
IEICE Technical Research Report, CS91–19, Jun. 26, 1991, pp. 15–22.

*Primary Examiner*—Gilberto Barron, Jr.
*Attorney, Agent, or Firm*—Nikaido, Marmelstein, Murray & Oram LLP

[57] ABSTRACT

An authentication system whereby authentication load can be distributed in the network without sharing secret information of users is provided.

The system has a single master authentication center arranged in the network, the master authentication center sharing with the user a user secret key, and a plurality of slave authentication centers sharing with the master authentication center respective secret keys different from the user secret key. The master authentication center authenticates the user by using the user secret key and issues a certificate information which certifies legitimation of the user, to the user if the user is authenticated as a legitimate user. The slave authentication center authenticates the certificate information from the user and issues a permission information which allows an access to a specified server or an application server in the network, to the user if the user is authenticated as a legitimate user.

5 Claims, 11 Drawing Sheets

① REQUEST AND ISSUANCE OF USER CERTIFICATE
② REQUEST AND ISSUANCE OF SERVICE UTILIZATION PERMISSION
③ REQUEST AND ENJOYMENT OF NETWORK SERVICE

AUTHENTICATION SYSTEM

TECHNICAL FIELD

The present invention relates to an authentication system for identifying a user by network when the user intends to get network services.

BACKGROUND ART

In order to confirm that a user who requests network services or communications (hereinafter called as a network user) is a legitimate user, it is necessary at the network side to authenticate this user.

A prover is in general identified such that;

(1) information possessed only by the prover, (2) is identified by a verifier by means of a certain method, where the prover is a person being authenticated and the verifier is a person authenticating.

The information possessed only by the prover (1) can be classified to the following two information of;

(1-1) information artificially provided (password, identification number, secret key, etc), and (1-2) information based upon individual attribute (holograph, fingerprint, voiceprint, retina pattern, etc).

Authentication depending on the information based upon individual attribute (1-2) except for the holograph is now not appropriate for use in an authentication device via a network because of its low receptive capacity in society, its poor convenience, its poor identification ratio and a high manufacturing cost of the authentication apparatus. Therefore, in most cases, the information artificially provided (1-1) such as password, secret number or secret key are used as the information possessed only by the prover.

The information artificially provided (information inherent in user) can be classified, depending upon its storing way, to the following three methods of;

(1-1-1) storing information in mind of the user (password, identification number, etc), (1-1-2) storing information in a storage possessed by the user (for general key, magnetic card, IC card, etc), and (1-1-3) storing information by combination of (1-1-1) and (1-1-2) (cash dispenser provided in a banking organ, etc).

Since the above classification is performed from a standpoint of an authentication system, a case wherein the user takes a note of his password or identification number to his memorandum will be classified to (1-1-1).

In a computer network, the above-mentioned method of storing information in mind of the user (1-1-1) is mainly utilized. However, according to this storing method (1-1-1), impersonation can be relatively easily performed by decoding or stealing the password or identification number and also, in most cases, this impersonation will not be found out by the person himself until he practically suffers damage. This is because the secret information according to this method (1-1-1) itself may be directly revealed, and thus leakage, stealing or wiretap of the password or of the identification number will be easily succeeded without consciousness of the user.

Contrary to this, according to the method of storing information in a storage possessed by the user (1-1-2), since the user can found out loss or stealing of his possessed storage and thus possible damage can be foreknown, the damage can be prevented from occurring by performing an adequate procedure against the loss or stealing. The storing method (1-1-3) combined by (1-1-1) and (1-1-2) will be effective so as to prevent illegality even if the possessed storage is stolen. Of course, however, the damage will not be prevented from occurring if the storage is forged without consciousness of the network and the user. Therefore, it is desired to use a storage which is difficult to forge. For this aim, an IC card with CPU (herein after called as a smart card) which will keep high confidentiality is the optimum.

The method of identifying by the verifier (2) can be substantially classified, depending upon what kind of information does the prover present to the verifier (network), to the following two methods of;

(2-1) presenting user's inherent information as it is, and (2-2) presenting a calculation result of the user's inherent information.

However, the method of presenting user's inherent information (2-1) has disadvantage of easily revealing his secret inherent information. In particular, if this method is combined with the aforementioned method of storing information in mind of user (1-1-1), there may be extremely dangerous for revealing the secret inherent information to public. The method of presenting a calculation result of the user's inherent information (2-2) may be classified in accordance with kinds of this calculation.

Anyway, the present invention relates to an authentication method of sharing secret user's inherent information between a prover (user) and a verifier (network), encrypting and decrypting the information at the user and the network, respectively, and then checking identification of the decrypted information with the shared information so as to verify the user.

It should be noted that it is difficult to combine the method of presenting a calculation result of the user's inherent information (2-2) with the authentication method using the information based upon individual attribute (1-2).

As is described above, the combination of the storing method (1-1-1) with the method of presenting user's inherent information (2-1) is the most dangerous, and the combination of the storing method (1-1-3) with the method of presenting a calculation result of the user's inherent information (2-2) is the safest. An authentication system using this latter combined method with smart cards is now realized in a part of mobile communication networks such as GSM (Global System for Mobile communications).

However, according to the system using the method of presenting a calculation result of the user's inherent information (2-2), since the decryption calculation has to be performed at every authentication process, load of the authentication process will be concentrated to an authentication device in the network, which manages secret information of users.

In order to avoid such problem, load of the calculations for authentication can be distributed in a plurality of authentication devices by providing the secret information of users to them. However, dispersing the secret information of users to the plurality of the authentication devices will result not only lowered safety of authentication but also extremely increased cost for managing and for operating the secret information in safe.

DISCLOSURE OF INVENTION

It is therefore an object of the present invention to provide an authentication system whereby authentication load can be distributed in the network without sharing secret information of users when each of the users is verified.

According to the present invention, an authentication system adopting an authentication scheme for verifying a user from a network, by sharing the same secret key between the user and the network, encrypting a known information using the secret key at the user to produce first encrypted information, transmitting the first encrypted information from the user to the network, encrypting the known information using the secret key at the network to produce second encrypted information, and collating the transmitted first encrypted information with the produced second encrypted information at the network, is provided. The system has a single master authentication center arranged in the network, the master authentication center sharing with the user a user secret key, and a plurality of slave authentication centers sharing with the master authentication center respective secret keys different from the user secret key. The master authentication center authenticates the user by using the user secret key and issues a certificate information which certifies legitimation of the user, to the user if the user is authenticated as a legitimate user. The slave authentication center authenticates the certificate information from the user and issues a permission information which allows an access to a specified server or an application server in the network, to the user if the user is authenticated as a legitimate user.

As will be apparent from the above description, only one master authentication center possesses the user secret keys other than the respective users, and therefore each of the user secret keys is not shared by a plurality of users. Furthermore, since the master authentication center authenticates the user by using this user secret key and issues a certificate information which certifies legitimation of the user and the slave authentication center authenticates the certificate information from the user and issues a permission information which allows an access to a specified server or an application server in the network, authentication load can be distributed.

The application server can execute the role of the above-mentioned slave authentication center. In this case, the permission information and also the slave authentication center can be omitted.

It is preferred that the system adopts an authentication scheme not only for verifying a user from a network, by sharing the same secret key between the user and the network, encrypting a known information using the secret key at the user to produce first encrypted information, transmitting the first encrypted information from the user to the network, encrypting the known information using the secret key at the network to produce second encrypted information, and collating the transmitted first encrypted information with the produced second encrypted information at the network, but also for verifying the network from the user, by encrypting a known information using the secret key at the network to produce third encrypted information, transmitting the third encrypted information from the network to the user, encrypting the known information using the secret key at the user to produce fourth encrypted information, and collating the transmitted third encrypted information with the produced fourth encrypted information at the user. This mutual authentication can improve security and certainty of authentication.

It is also preferred that the user has an IC card provided with a CPU (smart card), and that the smart card executes management of the user secret key and encryption and decryption of the information. By using such a smart card for managing a user secret key and for encrypting information, the secret key will not reveal to a client terminal and therefore forgery thereof will become quite difficult resulting to keep higher security of authentication.

Preferably, the secret key used for encrypting the known information is a key using a random number generated at the user. Encryption using this key with a random number will provides more highly security.

BEST MODE FOR CARRYING OUT THE INVENTION

Referring to drawings, embodiments according to the present invention will be described in detail.

First Embodiment

Figure 1:
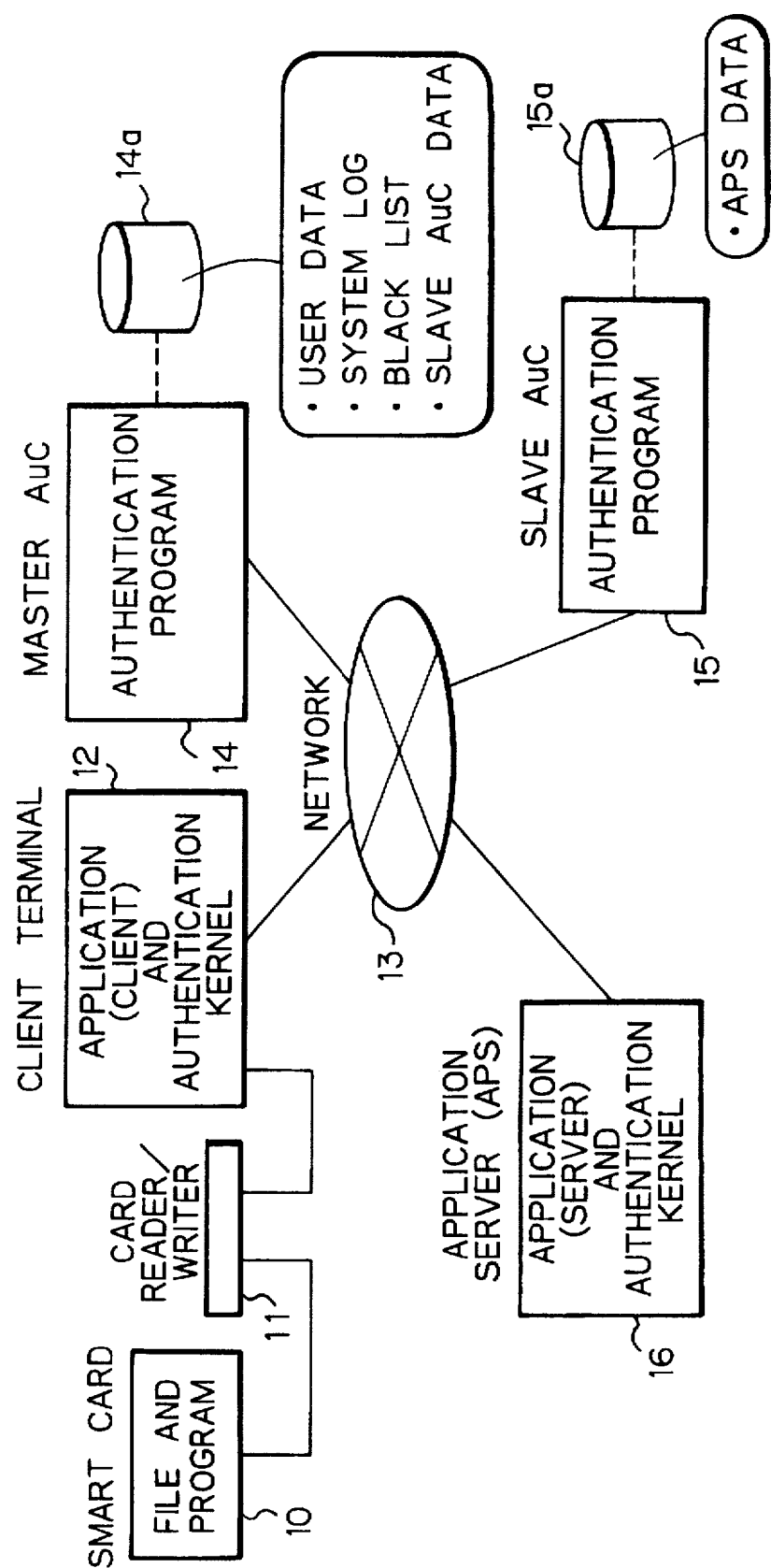
FIG. 1 is a block diagram schematically showing a constitution of an embodiment (first embodiment) of an authentication system according to the present invention.

FIG. 1 is a block diagram schematically showing a constitution of an embodiment of an authentication system according to the present invention.

This embodiment utilizes the already mentioned method of presenting the calculation result of user's inherent information (2-2) and also the already mentioned method of storing the user's inherent information in a smart card (1-1-2). According to the present invention, however, the method of storing the user's information in mind of the user (1-1-1) or the storing method (1-1-3) of combination of (1-1-1) and (1-1-2) may be utilized. It is not easy and will result to reveal the secret information to perform the calculation of the method (2-2) by the user himself. Thus, this calculation should be done by a possession of the user, having both storing and calculation functions, such as a smart card instead of the user himself. In this case, the above-mentioned storing methods (1-1-2) and (1-1-3) are used.

In FIG. 1, reference numeral 10 denotes a smart card provided with program and file which will be described later and possessed by each user, 11 denotes a card reader/writer for reading information from or writing information to the smart card 10, and 12 denotes a client terminal connected to the reader/writer 11, provided with client side application and authentication kernel, respectively. The reader/writer 11 will be mounted inside or outside of the client terminal 12.

The smart card 10 is constituted by an IC card with arithmetic function, which consists of a memory having a capacity of for example about 16 KB and a CPU of for example 8 bits. The client terminal 12 is constituted by a general purpose work station or a general purpose personal computer and connected to a network 13 such as for example LAN via a communication line. This client terminal 12 is an access point of the user to the network 13 and also a terminal for providing network service from an application server side. Although only one client terminal 12 is illustrated in FIG. 1, in fact there may be a plurality of client terminals having the similar constitution as the terminal 12 and connected via respective communication lines.

A single master authentication center (master AuC) 14 provided with authentication program which will be described later, a plurality of slave authentication centers (slave AuCs) 15 provided with authentication program which will be described later, and at least one application server (APS) 16 provided with server side application and authentication kernel are connected to the network 13 so as to be able to communicate with the client terminal 12 via this network 13.

In a database 14a provided for the master authentication center 14, the least of user data such as user's secret keys, system log, black list of the users and slave AuC data such as secret keys of the respective slave authentication centers 15 are stored. In a database 15a provided for the slave authentication center 15, the least of APS data such as secret key(s) of the application server(s) 16 are stored. The master authentication center 14, the slave authentication center 15 and the application server 16 are constituted by general purpose work stations, respectively. Communications between the general purpose work stations and between the general purpose work station and the general purpose personal computer are carried out through RPC (Remote Procedure Call).

The memory in the smart card 10 stores a secret key inherent in a smart card holder (user secret key Ku). The CPU in the smart card 10 is programed so as to calculate a cryptographic function f with this secret key Ku.

The network 13 has the only one master authentication center 14, and the user secret key Ku is held only by this master authentication center 14. Both this single master authentication center 14 and the slave authentication centers 15 together have respective secret information inherent in the respective slave authentication centers 15 (slave AuC secret keys Ks1, Ks2, Ks3, . . . ). Also, both the application servers 16 for providing network services to the users and the slave authentication centers 15 together have secret information inherent in every application servers 16 (APS secret keys Ka1, Ka2, Ka3, . . . ).

Authentication processes in this embodiment will now be described. In the following processes, suppose that a user intends to enjoy a desired network service from a specific application server 16.

First, the user inserts his possessing smart card 10 into the reader/writer 11 and then accesses the client terminal 12 as follows so as to activate the smart card 10.

For the card user, a PIN (Personal Identification Number) code has been previously defined, and this defined PIN code has been stored in the smart card 10. The user inputs his PIN code through the client terminal 12 into the smart card 10 so that coincidence between the input PIN code and one stored in the smart card 10 is checked. This check of the PIN code is executed by internal operation of the smart card 10. If PIN code input is successively failed three times, no more access of user capability is possible. Since the memory in the smart card 10 is a nonvolatile storage, the number of the past successive PIN input failure will be held even if the power is off.

Figure 2:
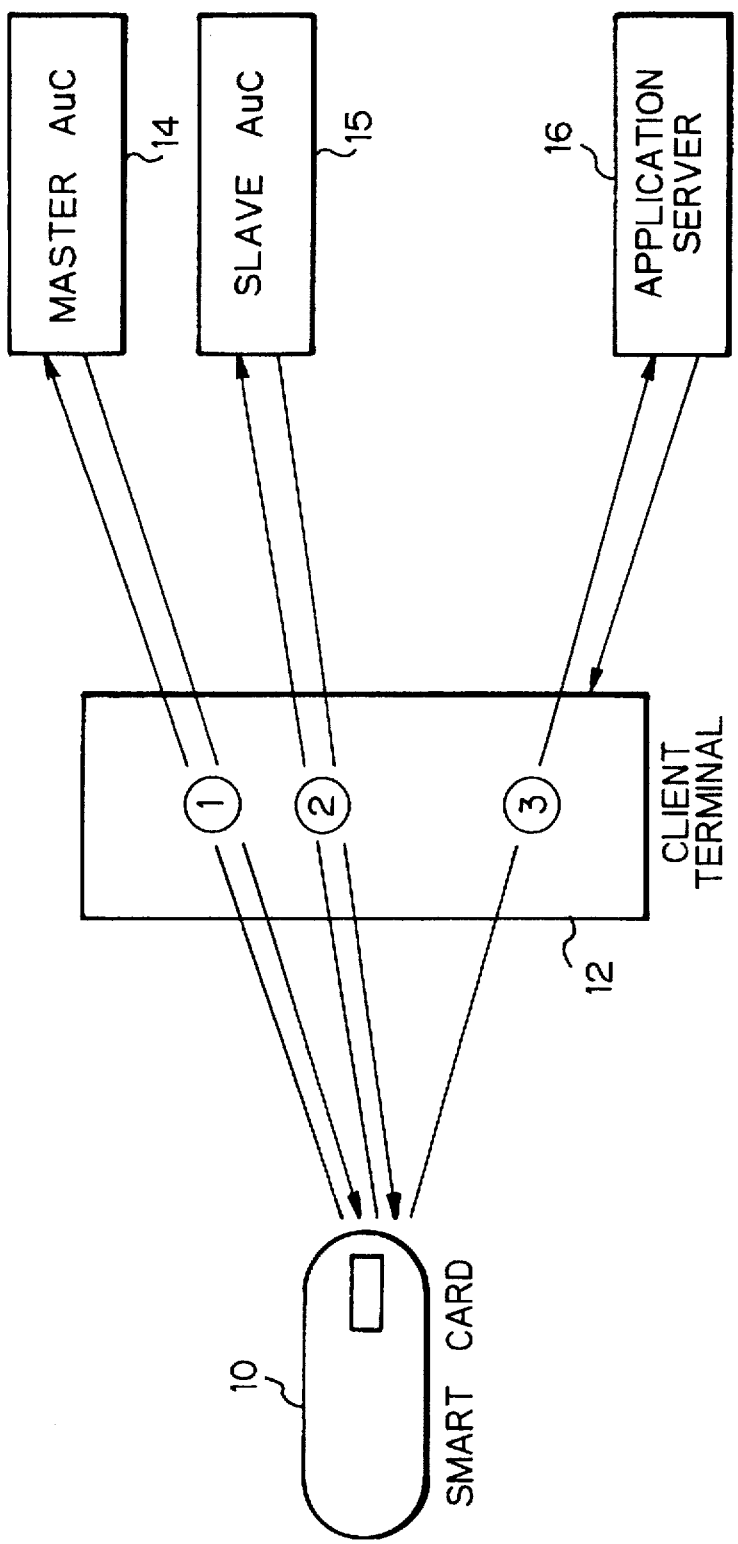
FIG. 2 is a sketch schematically showing three phase sequence of authentication processes in the embodiment shown in FIG. 1.

After the smart card 10 is activated by local verification between the user and the smart card 10, authentication processes are carried out with three phase sequence schematically shown in FIG. 2.

A first phase is ① request and issuance of a user certificate. In this first phase, the user side (smart card 10) requests the master AuC 14 to issue a certification information (user certificate) used for executing authentication procedure with the slave AuC 15. The issued user certificate which has a valid period is stored in the smart card 10. Prior to accessing the master AuC 14, the user side (smart card 10 or client terminal 12) confirms the validity of the already obtained user certificate. As long as the user certificate is valid, the authentication processes can be jumped to a next second phase without accessing the master AuC 14. This causes throughput in the master AuC 14 to decrease.

The second phase is ② request and issuance of a service utilization license. In this second phase, the user side (smart card 10) requests, with indicating the user certificate, the slave AuC 15 to issue a permission information (service utilization license) for utilizing the application server 16. The slave AuC 15 will verify the User Certification presented by the smart card 10, and issue the service utilization permission if verified.

A third phase is ③ request and enjoyment of a network service. In this third phase, the user side (smart card 10) requests, with indicating the service utilization license, the application server 16 to provide a desired network service. The application server 16 will verify the indicated service utilization license and provide the requested service to the client terminal 12 if the indicated license is verified.

Figure 3:
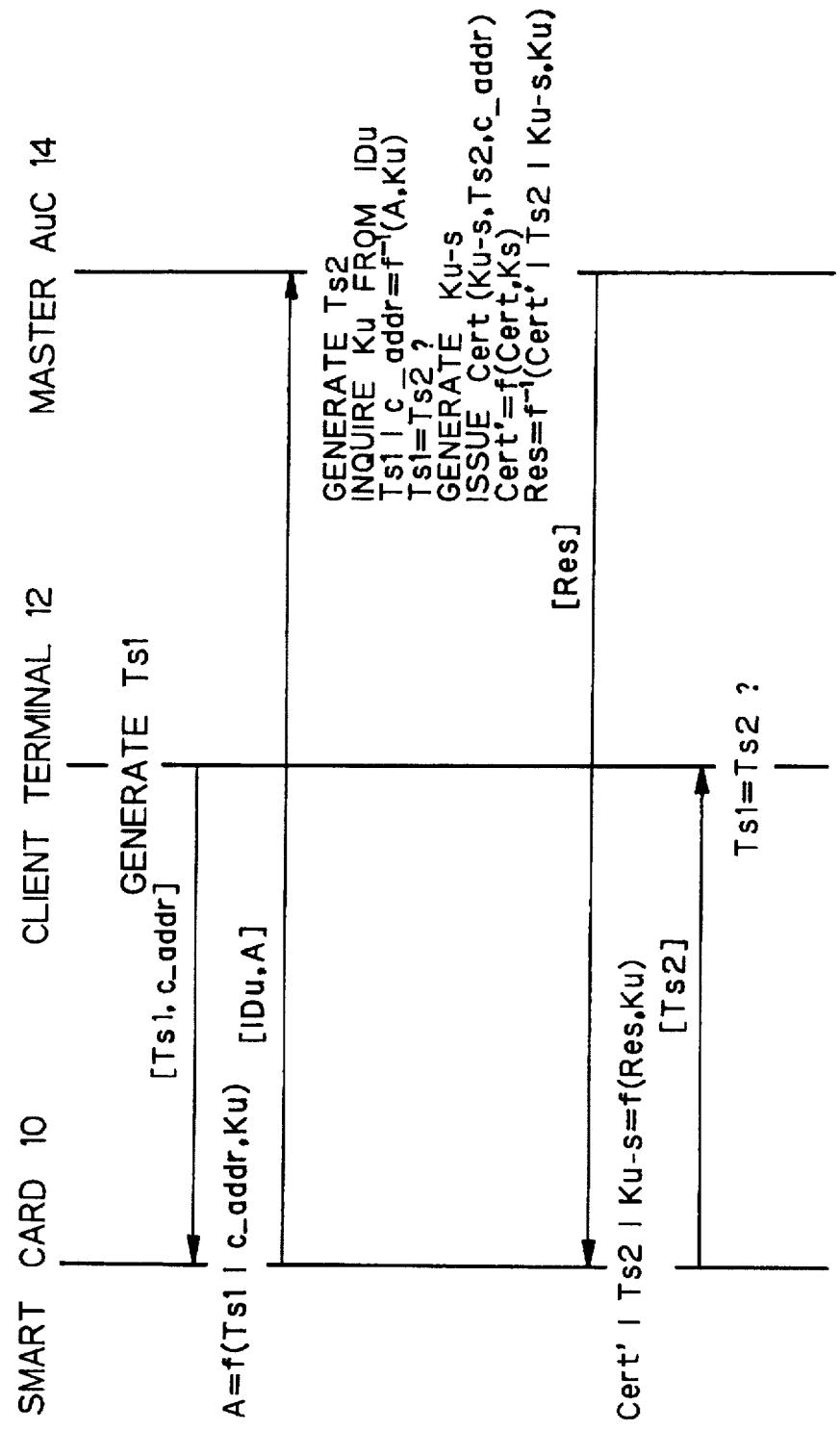
FIG. 3 is a sketch showing detail procedure in a first authentication phase shown in FIG. 2.
Figure 4:
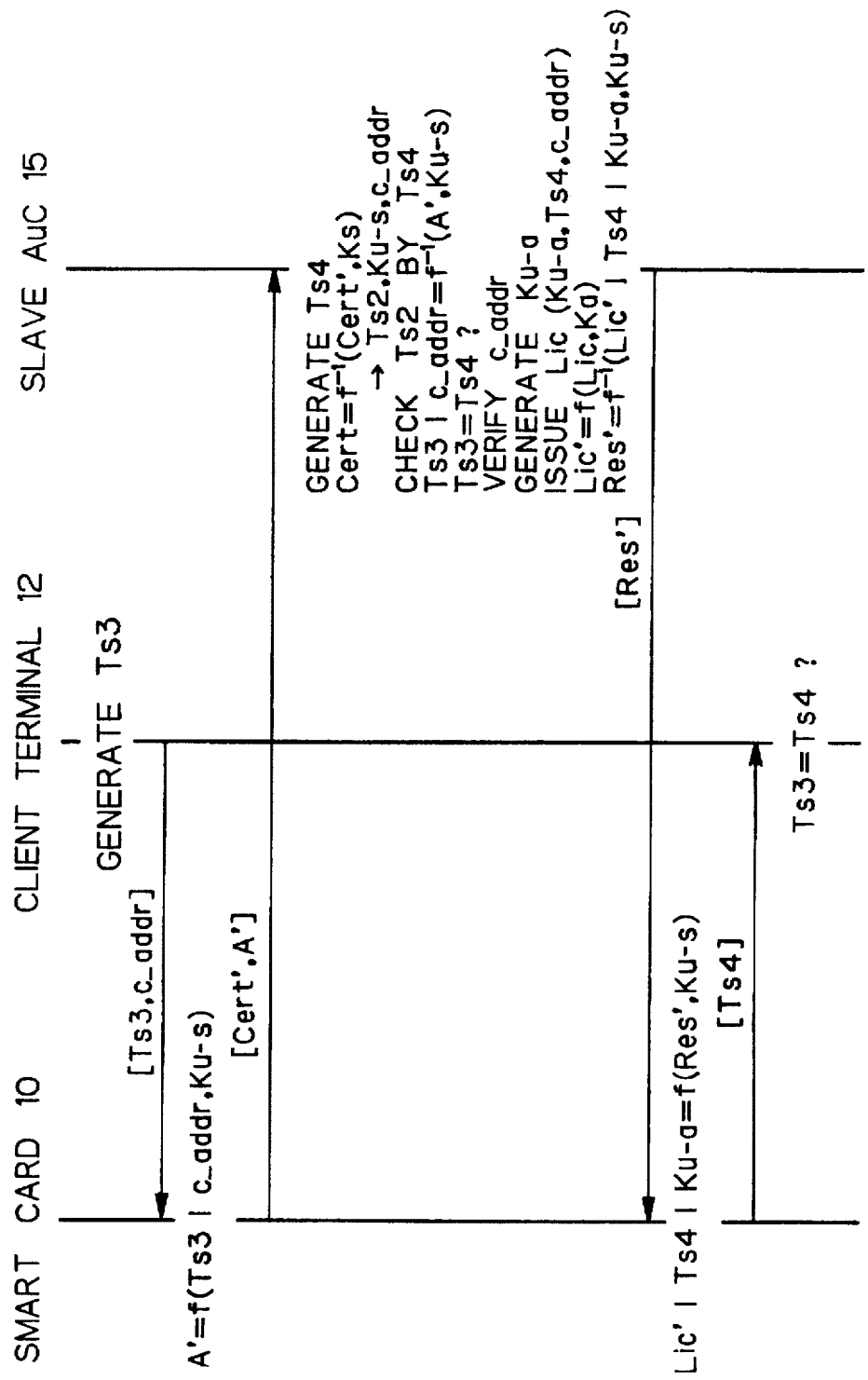
FIG. 4 is a sketch showing detail procedure in a second authentication phase shown in FIG. 2.
Figure 5:
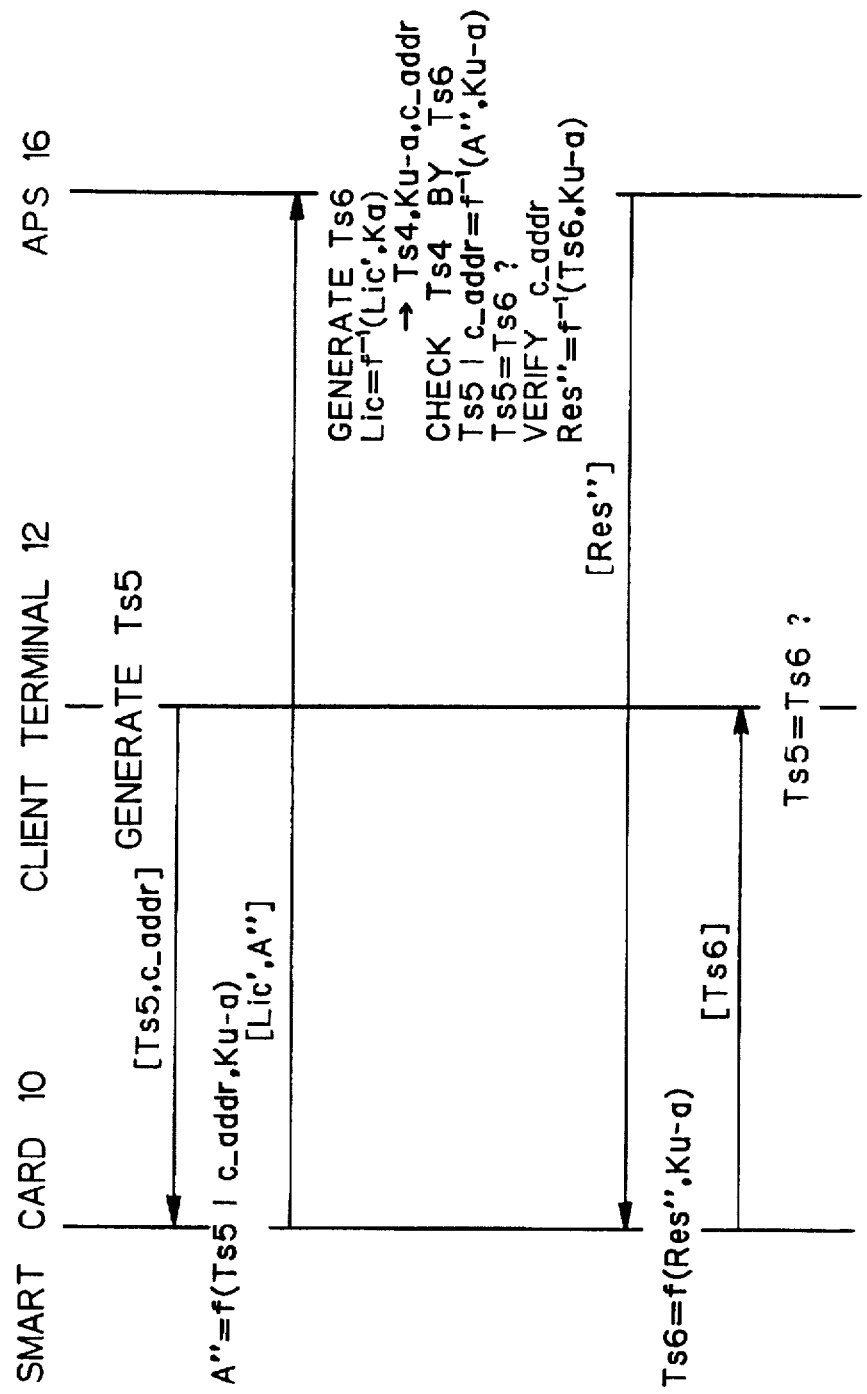
FIG. 5 is a sketch showing detail procedure in a third authentication phase shown in FIG. 2.

Referring to FIGS. 3, 4 and 5 which show detail procedure in the above-mentioned respective authentication phases, each procedure will be described in detail. Symbols illustrated in these figures indicate as follows.

| | |
|---|---|
| AuC | authentication center |
| IDu | inherent number assigned to a smart card (held by the smart card and the master AuC only) |
| Ku | user secret key (held by the smart card and the master AuC only) |
| Ks | slave AuC secret key (shared by the master AuC and each of the slave AuCs only) |
| Ka | APS secret key (shared by slave AuC and each of the APSs only) |
| Ku-s | secret key between the smart card and the slave AuC (disposable key generated by master AuC at every issuance of User Certificate) |
| Ku-a | secret key between the smart card and the APS (disposable key generated by slave AuC at every issuance of Service Utilization License) |
| c_addr | network address of the client terminal |
| Ts | time stamp (indicating current time or expiring time of valid period) |
| Cert | user certificate (issued by the master AuC and decrypted only by the slave AuC) |
| Lic | service utilization license (issued by the slave AuC and decrypted only by the APS) |

| | |
|---|---|
| A/Res | access/response message |
| \| | process of concatenating data with each other |
| X = Y? | process of confirming coincidence of time stamps X and Y within a predetermined margin |
| f(data,K) | process of encrypting data with key K |
| $f^{-1}$(data,K) | process of decrypting or inversely encrypting data with K |

FIG. 3 illustrates procedure in the first phase ① for requesting and issuing a user certificate. As shown in this figure, at first, the client terminal 12 generates a time stamp Ts1 indicating the current time. The generated time stamp Ts1 and a network address c_addr of this client terminal 12 are transmitted to the smart card 10. In FIG. 3, this transmission is represented by [Ts1,c_addr]. These transmitted data are concatenated with each other in the smart card 10, and then the concatenated data is encrypted by using a user secret key Ku previously stored in the smart card 10 to obtain A=f(Ts1|c addr,Ku). Then, an inherent card number IDu stored in this smart card 10 is read out and transmitted to the master AuC 14 with the encrypted A as for an authentication request. This transmission is represented by [IDu,A] in FIG. 3. The card number IDu is transmitted without encryption. Although all communications between the smart card 10 and the master AuC 14 are executed through the client terminal 12, this client terminal 12 itself cannot analyze the encrypted data.

The master AuC 14 generates a time stamp Ts2 indicating a time of receiving the authentication request from the client terminal 12. Then, a user secret key Ku is inquired from the received card number IDu using the database 14a. Then, the encrypted A is decrypted by means of a function Ts1|c_ addr=$f^{-1}$(A,Ku) with the inquired user secret key Ku to obtain the time stamp Ts1 of the client terminal 12 and the network address c addr. Coincidence between the obtained time stamp Ts1 and the time stamp Ts2 generated at the master AuC 14 is then verified. Since Ts2 is necessarily delayed from Ts1, this collation of coincidence has to be considered with a margin of time delay of for example ten seconds. If the user secret key Ku used in encryption at the smart card side to produce A is incorrect key, the decrypted Ts1 will extremely differ from Ts2. Thus, if the decrypted Ts1 does not coincide with Ts2 with consideration of the margin, failure of the authentication is informed to the user side and the process is terminated.

If the decrypted Ts1 coincides with Ts2 with consideration of the margin, following procedure for issuing a user certificate will be executed. First, at the master AuC 14, a secret key between the smart card 10 and the slave AuC 15 Ku-s is generated and then an original user certificate Cert(Ku-s, Ts2,c_addr) consisting of Ku-s, Ts2 and c_addr. This user certificate Cert is encrypted using a slave AuC secret key Ks which is shared only by the master AuC and its slave AuC, to produce Cert'. Namely, by using a cryptographic function f, Cert' is obtained from Cert'=f(Cert,Ku).

Thereafter, Res is generated by inversely encrypting Cert' as well as Ts2 and Ku-s using the user secret key Ku, namely from Res=$f^{-1}$(Cert'|Ts2|Ku-s,Ku). The generated Res is then returned to the smart card 10 as a response message with respect to the access from the user ([Res]). Because of lower calculation capacity, it is desired that the smart card 10 executes only calculation based upon encryption function f. Thus, at the master AuC 14, inverse encryption $f^{-1}$ is executed instead of encryption f.

When the smart card 10 receives the response message Res, the received Res is decoded by the function f using the user secret key Ku, namely from Cert'|Ts2|Ku-s=f(Res,Ku), to extract and store into the memory in the smart card 10 the encrypted user certificate Cert', the time stamp Ts2 and the secret key Ku-s. The extracted time stamp Ts2 is transmitted to the client terminal 12 and therein verified, with respect to coincidence, with the time stamp Ts1 which was generated at this terminal 12 (Ts1=Ts2?). Thus, the master AuC 14 is verified by the smart card 10 resulting that the smart card 10 and the master AuC 14 are mutually authenticated each other. According to the above-mentioned mechanism, the secret key between the smart card and the slave AuC Ku-s is used for communication between the smart card 10 and the slave AuC 15 without being revealed outside the smart card 10. Since Cert' is encrypted using the slave AuC secret key Ks, the smart card 10 and the client terminal 12 cannot analyze it at all.

At a next authentication procedure, prior to accessing the master AuC 14, the client terminal 12 read out the time stamp Ts2 stored in the smart card 10 and compares it with the current time to confirm the validity of the stored user certificate Cert'. As long as the user certificate is valid, the authentication processes can be jumped the first phase shown in FIG. 3 to the next second phase without accessing the master AuC 14 causing throughput in the master AuC 14 to decrease.

FIG. 4 illustrates procedure in the second phase ② for requesting and issuing a service utilization license. As shown in this figure, at first, the client terminal 12 generates a time stamp Ts3 indicating the current time. The generated time stamp Ts3 and a network address c_addr of this client terminal 12 are transmitted to the smart card 10. In FIG. 4, this transmission is represented by [Ts3,c_addr]. If this second phase is executed just after the first phase, as Ts3 is equal to Ts1 with consideration of the margin and c_addr has already been sent, this process can be omitted. These transmitted data are concatenated with each other in the smart card 10, and then the concatenated data is encrypted by using the secret key Ku-s which was transmitted from the master AuC 14 with the user certificate Cert' and stored in the smart card 10, to obtain A'=f(Ts3|c_addr,Ku-s). Then, the user certificate Cert' is transmitted to the slave AuC 15 with the encrypted A'. This transmission is represented by [Cert',A'] in FIG. 4. Although all communications between the smart card 10 and the slave AuC 15 are also executed through the client terminal 12, this client terminal 12 itself cannot analyze the encrypted data.

The slave AuC 14 generates a time stamp Ts4 indicating a time of receiving the access from the client terminal 12. Then, the encrypted user certificate Cert' is decrypted by means of a function Cert=$f^{-1}$(Cert',Ks) using the slave AuC secret key Ks stored in the slave AuC 15 to obtain a decrypted Cert. In this decrypted user certificate Cert, the time stamp Ts2 indicating the issuance time of this user certificate Cert, the secret key Ku-s and the network address of the client terminal 12 c_addr are included. Then, the obtained time stamp Ts2 is checked by the time stamp Ts4 to confirm that the user certificate Cert was issued at a time within a predetermined period from now. Thus, validity of this user certificate Cert is confirmed.

Then, the encrypted A' is decrypted by means of a function Ts3|c_addr=$f^{-1}$(A',Ku-s) with the secret key Ku-s contained in the user certificate Cert to obtain the time stamp Ts3 of the client terminal 12 and the network address c_addr.

Coincidence between the obtained time stamp Ts3 and the time stamp Ts4 generated at the slave AuC 15, and coincidence between c_addr contained in the user certificate Cert and c addr contained in A' are then verified. If the user certificate Cert is forged one, since the secret key Ku-s and the network address c_addr contained in this Cert cannot be extracted and also the decryption using this key Ku-s cannot be executed, the collation will be failed. Thus, in this case, the slave AuC 15 will not issue a service utilization license Lic and failure of the authentication is informed to the user side to terminate the process.

If the collation succeeds, following procedure for issuing a service utilization license Lic will be executed. First, at the slave AuC 15, a secret key between the smart card 10 and a specific application server 16 Ku-a is generated and then an original service utilization license Lic(Ku-a,Ts4,c_addr) consisting of Ku-a, Ts4 and c_addr. This service license Lic is encrypted using an APS secret key Ka which is shared only by the slave AuC and the specific application server, to produce Lic'. Namely, by using a cryptographic function f, Lic' is obtained from Lic'=f(Lic,Ka). This encrypted service license Lic' can be analyzed only by the specific application server having the secret key Ka.

Thereafter, Res' is generated by inversely encrypting Lic' as well as Ts4 and Ku-a using the secret key Ku-s, namely from Res'=f$^{-1}$(Lic'|Ts4|Ku-a,Ku-s). The generated Res' is then returned to the smart card 10 as a response message with respect to the access from the user ([Res']).

When the smart card 10 receives the response message Res', the received Res' is decoded by the function f using the secret key Ku-s, namely from Lic'|Ts4|Ku-a=f(Res',Ku-s), to extract and store into the memory in the smart card 10 the encrypted service utilization license Lic', the time stamp Ts4 and the secret key Ku-a. The extracted time stamp Ts4 is transmitted to the client terminal 12 and therein verified, with respect to coincidence, with the time stamp Ts3 which was generated at this terminal 12 (Ts3=Ts4?). Thus, the slave AuC 15 is verified by the smart card 10 resulting that the smart card 10 and the slave AuC 15 are mutually authenticated each other. According to the above-mentioned mechanism, the secret key between the smart card and the application server Ku-a is used for communication between the smart card 10 and the application server 16 without being revealed outside the smart card 10. Since Lic' is encrypted using the secret key Ka, the smart card 10 and the client terminal 12 cannot analyze it at all.

FIG. 5 illustrates procedure in the third phase ③ for requesting and enjoying a network service. As shown in this figure, at first, the client terminal 12 generates a time stamp Ts5 indicating the current time. The generated time stamp Ts5 and a network address c_addr of this client terminal 12 are transmitted to the smart card 10. In FIG. 5, this transmission is represented by [Ts5,c_addr]. If this third phase is executed just after the second phase, as Ts5 is equal to Ts3 with consideration of the margin and c_addr has already been sent, this process can be omitted. These transmitted data are concatenated with each other in the smart card 10, and then the concatenated data is encrypted by using the secret key Ku-a which was transmitted from the slave AuC 15 with the service utilization license Lic' and stored in the smart card 10, to obtain A"=f(Ts5|c_addr,Ku-a). Then, the service license Lic' is transmitted to the application server 16 with the encrypted A". This transmission is represented by [Lic',A"] in FIG. 5. Although all communications between the smart card 10 and the application server 16 are also executed through the client terminal 12, this client terminal 12 itself cannot analyze the encrypted data.

The application server 16 generates a time stamp Ts6 indicating a time of receiving the access from the client terminal 12. Then, the encrypted service utilization license Lic' is decrypted by means of a function Lic=f$^{-1}$(Lic',Ka) using the APS secret key Ka stored in the application server 16 to obtain a decrypted Lic. In this decrypted service utilization license Lic, the time stamp Ts4 indicating the issuance time of this license Lic, the secret key Ku-a and the network address of the client terminal 12 c_addr are included. Then, the obtained time stamp Ts4 is checked by the time stamp Ts6 to confirm that the license Lic was issued at a time within a predetermined period from now. Thus, validity of this license Lic is confirmed.

Then, the encrypted A" is decrypted by means of a function Ts5|c_addr=f$^{-1}$(A",Ku-a) with the secret key Ku-a contained in the license Lic to obtain the time stamp Ts5 of the client terminal 12 and the network address c_addr.

Coincidence between the obtained time stamp Ts5 and the time stamp Ts6 generated at the application server 16, and coincidence between c_addr contained in the license Lic and c addr contained in A" are then verified. If the service utilization license Lic is forged one, since the secret key Ku-a and the network address c_addr contained in this license Lic cannot be extracted and also the decryption using this key Ku-a cannot be executed, the collation will be failed. Thus, in this case, the application server 16 will not provide a network service and failure of the authentication is informed to the user side to terminate the process.

If the collation succeeds, at the application server 16, Res" is generated by inversely encrypting Ts6 using the secret key Ku-a, namely from Res"=f$^{-1}$(Ts6,Ku-a). The generated Res" is then returned to the smart card 10 as a response message with respect to the access from the user ([Res"]).

When the smart card 10 receives the response message Res", the received Res" is decoded by the function f using the secret key Ku-a, namely from Ts6=f(Res",Ku-a), to extract and store into the memory in the smart card 10 the encrypted time stamp Ts6. The extracted time stamp Ts6 is transmitted to the client terminal 12 and therein verified, with respect to coincidence, with the time stamp Ts5 which was generated at this terminal 12 (Ts5=Ts6?). Thus, the application server 16 is verified by the smart card 10 resulting that the smart card 10 and the application server 16 are mutually authenticated each other. If the mutual authentication succeeds, the application server provides the network service to the client terminal 12.

The above-mentioned authentication procedure is necessary for time synchronization between the master AuC 14, the slave AuC 15, the application server 16 and the client terminal 12. This is because a time information (time stamp) is used for an authentication data (data for cryptographic function) known by both the prover and the verifier. Instead of the time information, a random number generated at the verifier (network side) and transmitted to the user side can be utilized as an authentication data, like a challenge-response authentication protocol used in GSM. A second embodiment according to the present invention, which will be described later, uses this protocol.

In the aforementioned first embodiment, the information to be transmitted from the smart card 10 is encrypted directly using the user secret key Ku, the slave AuC secret key Ks or the APS secret key Ka. However, if a key is produced by encrypting a random number R generated at the smart card 10 using the user secret key Ku, the slave AuC secret key Ks or the APS secret key Ka and the information to be transmitted from the smart card 10 is encrypted using this produced encrypted key, higher security can be expected. In this case, the random number R has to also be transmitted to the master AuC 14, the slave AuC 15 or the application server 16.

Furthermore, although in the aforementioned embodiment, individual slave AuC keys Ks are provided for the respective slave AuCs, a single slave AuC key Ks can be shared by all the slave AuCs. In the latter case, however, security will be somewhat lowered.

Second Embodiment

Figure 6:
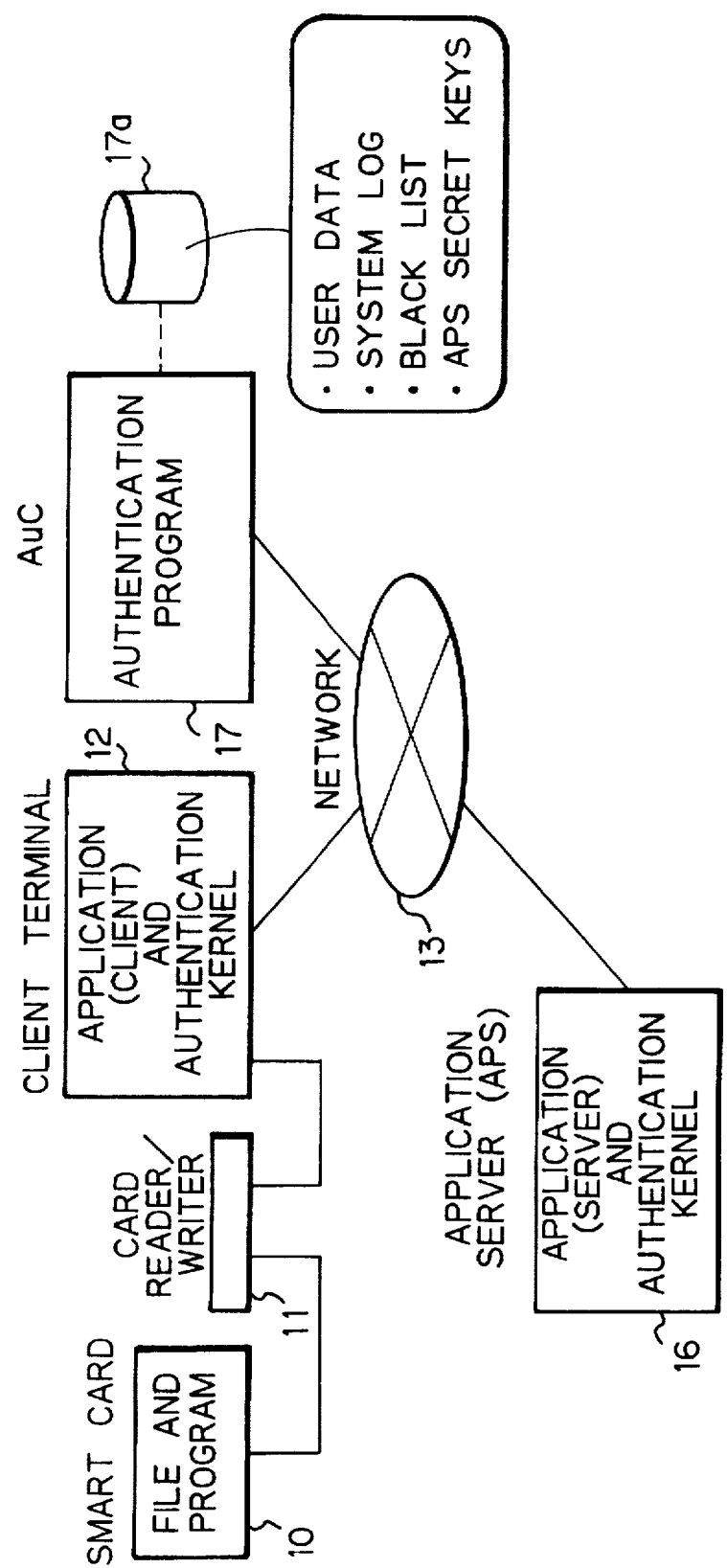
FIG. 6 is a block diagram schematically showing a constitution of an another embodiment (second embodiment) of an authentication system according to the present invention.

FIG. 6 is a block diagram schematically showing a constitution of an another embodiment of an authentication system according to the present invention.

In the figure, reference numeral 10 denotes a smart card provided with program and file which will be described later and possessed by each user, 11 denotes a card reader/writer for reading information from or writing information to the smart card 10, and 12 denotes a client terminal connected to the reader/writer 11, provided with client side application and authentication kernel, respectively. The reader/writer 11 will be mounted inside or outside of the client terminal 12.

The smart card 10 in this embodiment is constituted by an IC card with arithmetic function, which consists of a memory having a capacity of for example equal to or less than 8 KB and a CPU of for example 8 bits. As having a simpler constitution of this embodiment than that of the first embodiment, the smart card 10 in this embodiment has the smaller capacity memory. The client terminal 12 is constituted by a general purpose work station or a general purpose personal computer and connected to a network 13 such as for example LAN via a communication line. This client terminal 12 is an access point of the user to the network 13 and also a terminal for providing network service from an application server side. Although only one client terminal 12 is illustrated in FIG. 6, in fact there may be a plurality of client terminals having the similar constitution as the terminal 12 and connected via respective communication lines.

An authentication center (AuC) 17 provided with authentication program for verifying the user and at least one application server (APS) 16 provided with server side application for providing services to the user are connected to the network 13 so as to be able to communicate with the client terminal 12 via this network 13.

In a database 17a provided for the authentication center 17, the least of user data such as user's secret keys, system log, black list of the users and secret key(s) of the application server(s) 16 are stored. The authentication center 17 and the application server 16 are constituted by general purpose work stations, respectively. Communications between the general purpose work stations and between the general purpose work station and the general purpose personal computer are carried out through RPC (Remote Procedure Call).

The memory in the smart card 10 stores a secret key inherent in a smart card holder (user secret key Ku). The CPU in the smart card 10 is programed so as to calculate a cryptographic function f with this secret key Ku.

In the network 13, the user secret key Ku is held only by the authentication center 17.

Both this authentication center 17 and the application servers 16 together have respective secret information inherent in the respective application servers 16 (APS secret keys Ka1, Ka2, Ka3, ...).

Authentication processes in this embodiment will now be described. In the following processes, suppose that a user intends to enjoy a desired network service from a specific application server 16.

First, the user inserts his possessing smart card 10 into the reader/writer 11 and then accesses the client terminal 12 as follows so as to activate the smart card 10.

For the card user, a PIN code has been previously defined, and this defined PIN code has been stored in the smart card 10. The user inputs his PIN code through the client terminal 12 into the smart card 10 so that coincidence between the input PIN code and one stored in the smart card 10 is checked. This check of the PIN code is executed by internal operation of the smart card 10. If PIN code input is successively failed three times, the smart card 10 permits no more access and thus the authentication procedure terminates. Since the memory in the smart card 10 is a nonvolatile storage, the number of the past successive PIN input failure will be held even if the power is off. This storage will be cleared if PIN code check is succeeded within successive three times inputs.

After the smart card 10 is activated by local verification between the user and the smart card 10, authentication processes are carried out with following two phase sequence.

A first phase is request and issuance of a user certificate. In this first phase, the user side (smart card 10) requests the AuC 17 to issue a certification information (user certificate) which verifies him. The issued user certificate which has a valid period is stored in the smart card 10. Prior to accessing the AuC 17, the user side (smart card 10 or client terminal 12) confirms the validity of the already obtained user certificate. As long as the user certificate is valid, the authentication processes can be jumped to a next second phase without accessing the AuC 17. This causes throughput in the AuC 17 to decrease.

The second phase is request and enjoyment of a network service. In this phase, the user side (smart card 10) requests, with indicating the user certificate, the application server 16 to provide a desired network service. The application server 16 will verify the indicated user certificate and provide the requested service to the client terminal 12 if the indicated certificate is verified.

Figure 7:
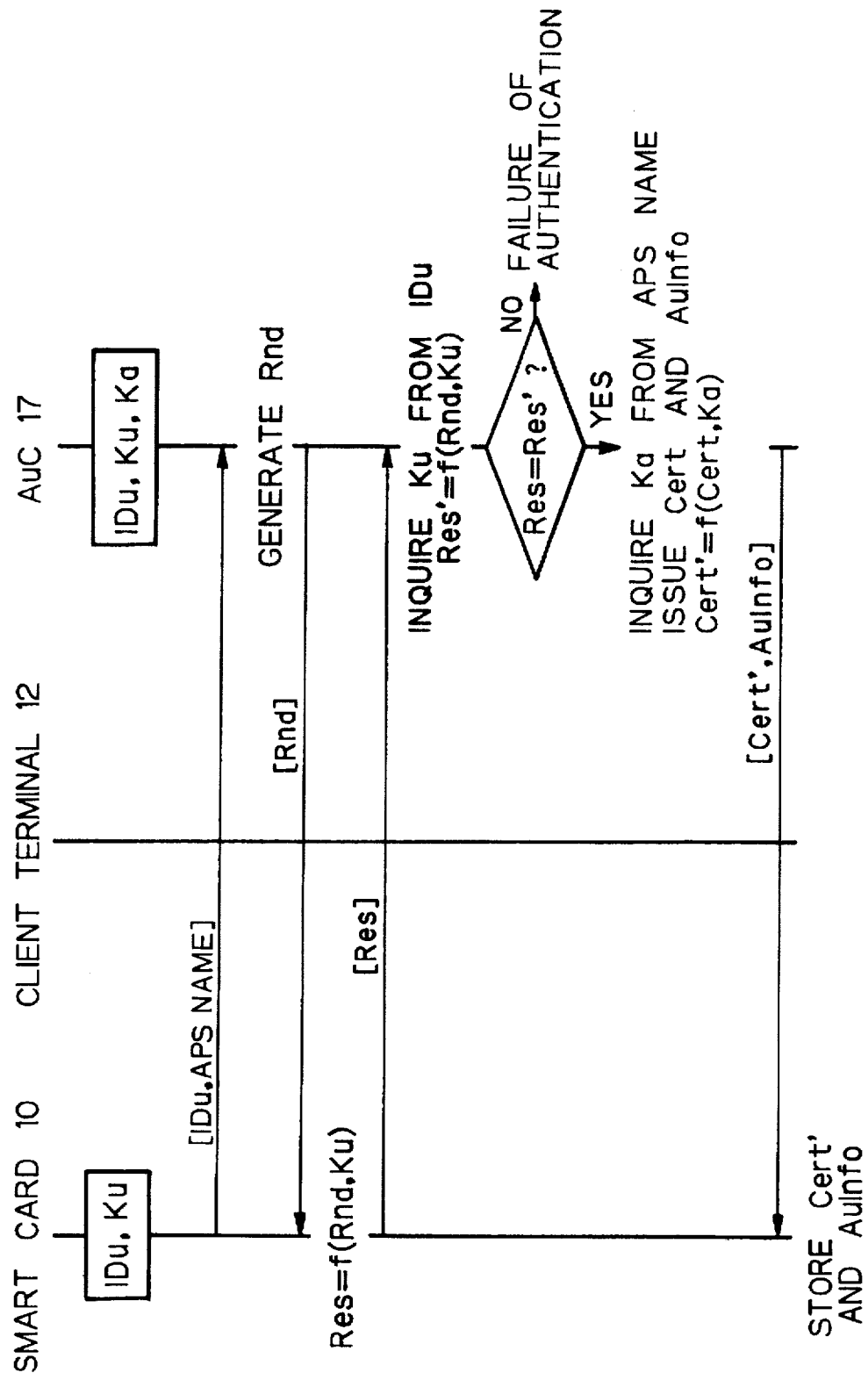
FIG. 7 is a sketch showing detail procedure in a first phase of an example of authentication processes in the embodiment shown in FIG. 6.
Figure 8:
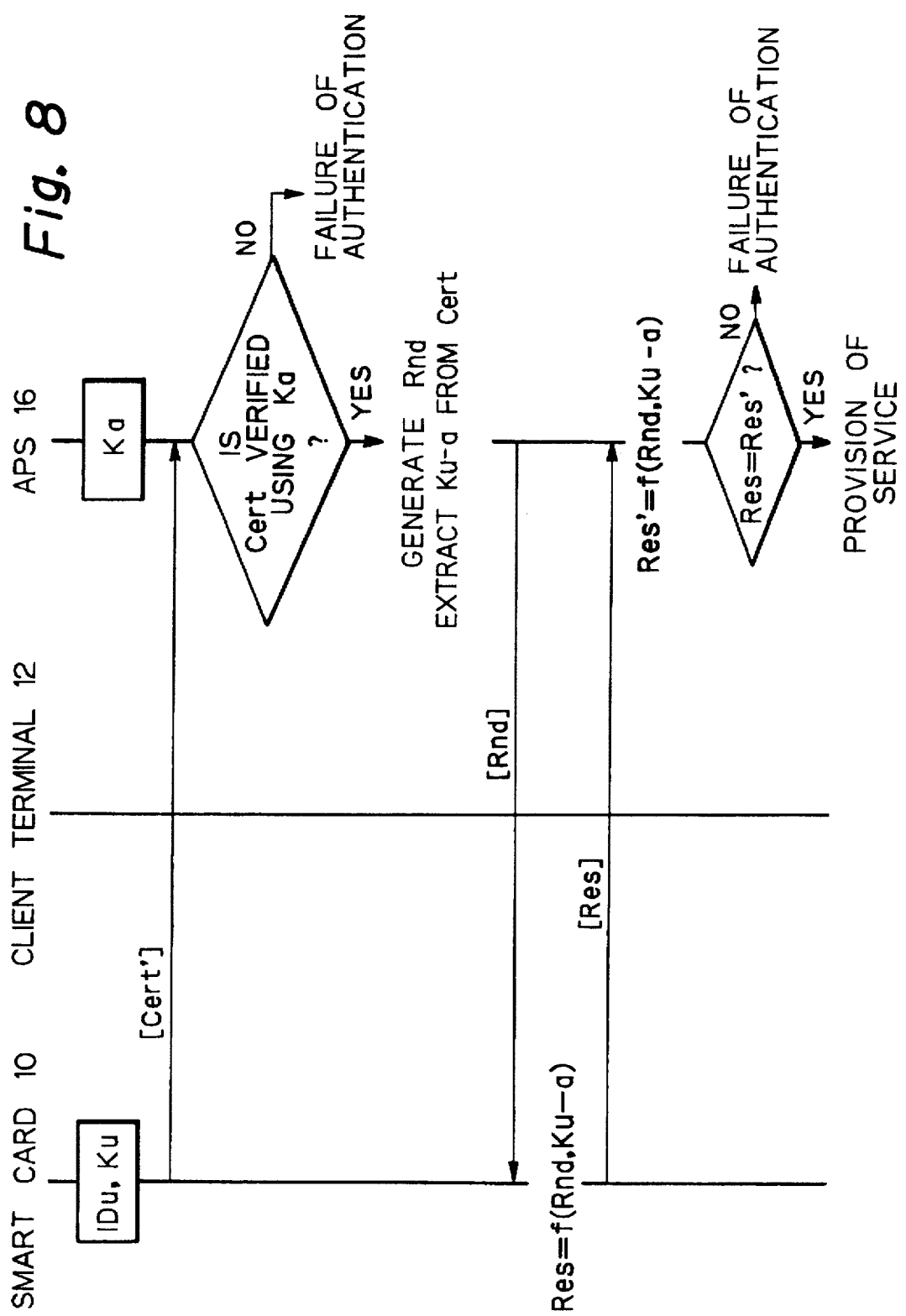
FIG. 8 is a sketch showing detail procedure in a second phase of the example of the authentication processes in the embodiment shown in FIG. 6.
Figure 9:
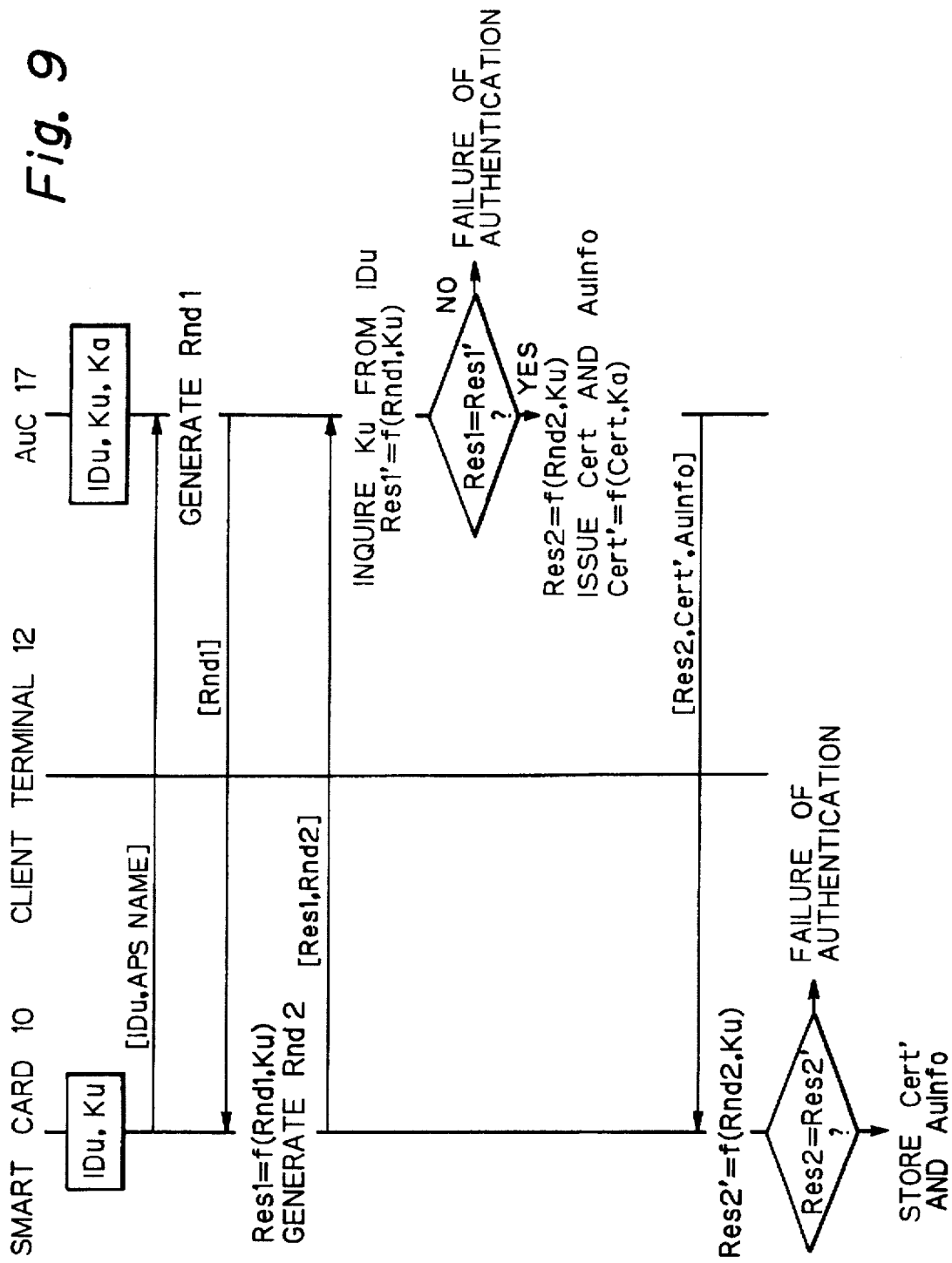
FIG. 9 is a sketch showing detail procedure in a first phase of an another example of authentication processes in the embodiment shown in FIG. 6.
Figure 10:
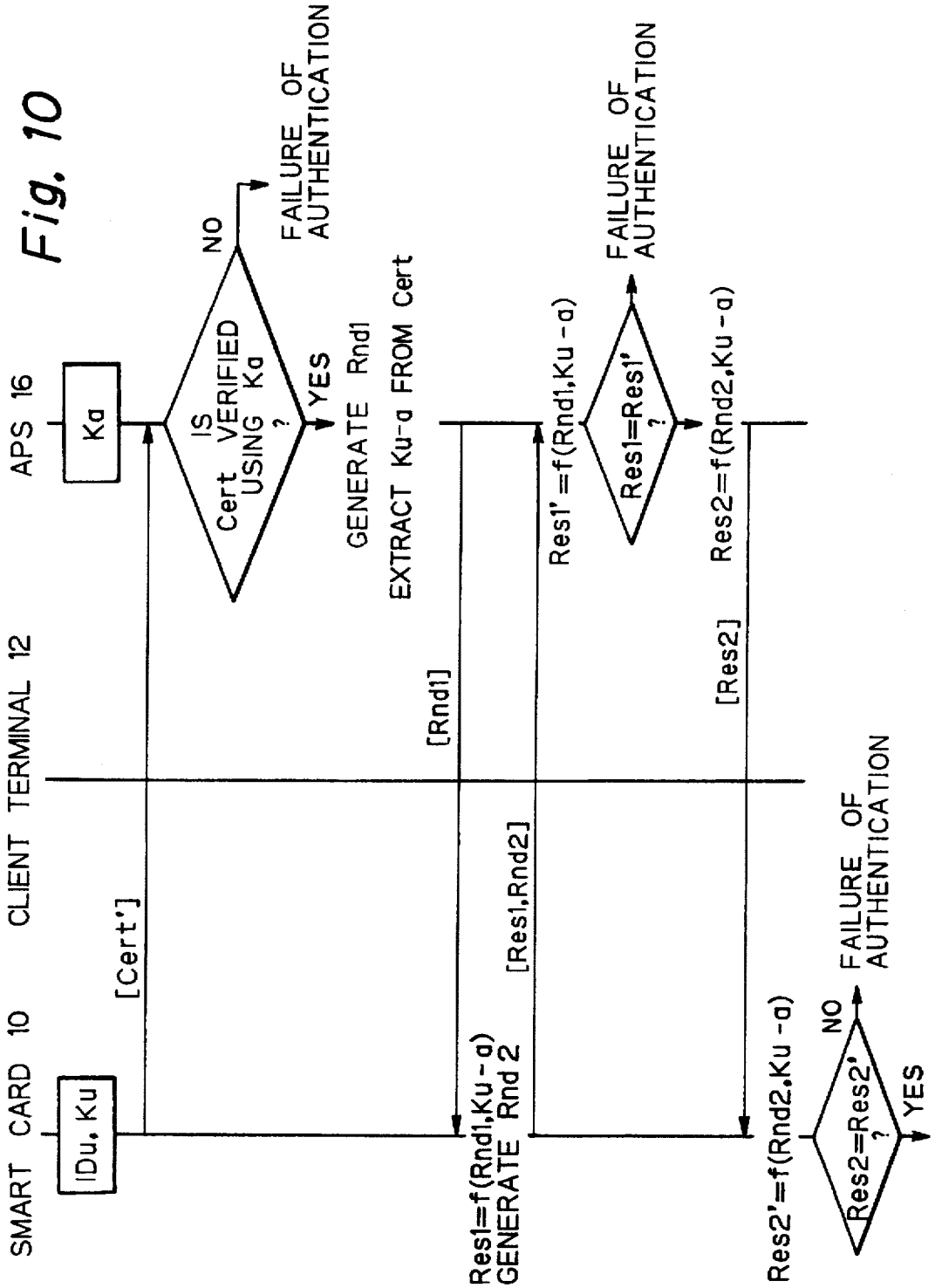
FIG. 10 is a sketch showing detail procedure in a second phase of the another example of the authentication processes in the embodiment shown in FIG. 6.

FIGS. 7 and 8 show an example of detail procedure in the above-mentioned respective authentication phases. FIGS. 9 and 10 show an another example of detail procedure wherein a mutual authentication mechanism is adopted. Combination of procedure of FIG. 7 and that of FIG. 10, and combination of procedure of FIG. 9 and that of FIG. 8 can be possible.

FIG. 7 illustrates procedure in the first phase for requesting and issuing a user certificate. As shown in this figure, at first, an inherent card number IDu stored in this smart card 10 is read out and transmitted to the AuC 17 with a name of the application server APS NAME which will provide a desired network service as an authentication request. This transmission is represented by [IDu,APS NAME] in FIG. 7. The card number IDu and the APS NAME are transmitted without encryption. The APS NAME will be referred when a user certificate Cert and an authentication information AuInfo are issued later.

The AuC 17 generates a random number Rnd and transmits it (called a challenge) to the smart card 10. The smart card 10 then encrypts the received random number Rnd using the user secret key Ku stored in its memory to generate a response Res by means of a function Res=f(Rnd,Ku). The generated response Res is returned to the AuC 17. The AuC 17 inquires the user secret key Ku from the received card number IDu using the database 17a, and then, executes the same encryption of the random number Rnd as done in the smart card 10 using the user secret key Ku to generate Res' by means of a function Res'=f(Rnd,Ku). The generated Res' is then compared with the response Res transmitted from the smart card 10. If the user is a legitimate user and the user secret key Ku is correct one, Res will coincides with Res'. However, if the user secret key Ku is incorrect, the calculated results Res and Res' will not coincide with each other. In this case, failure of the authentication is informed to the user side and the process is terminated.

Figure 11:
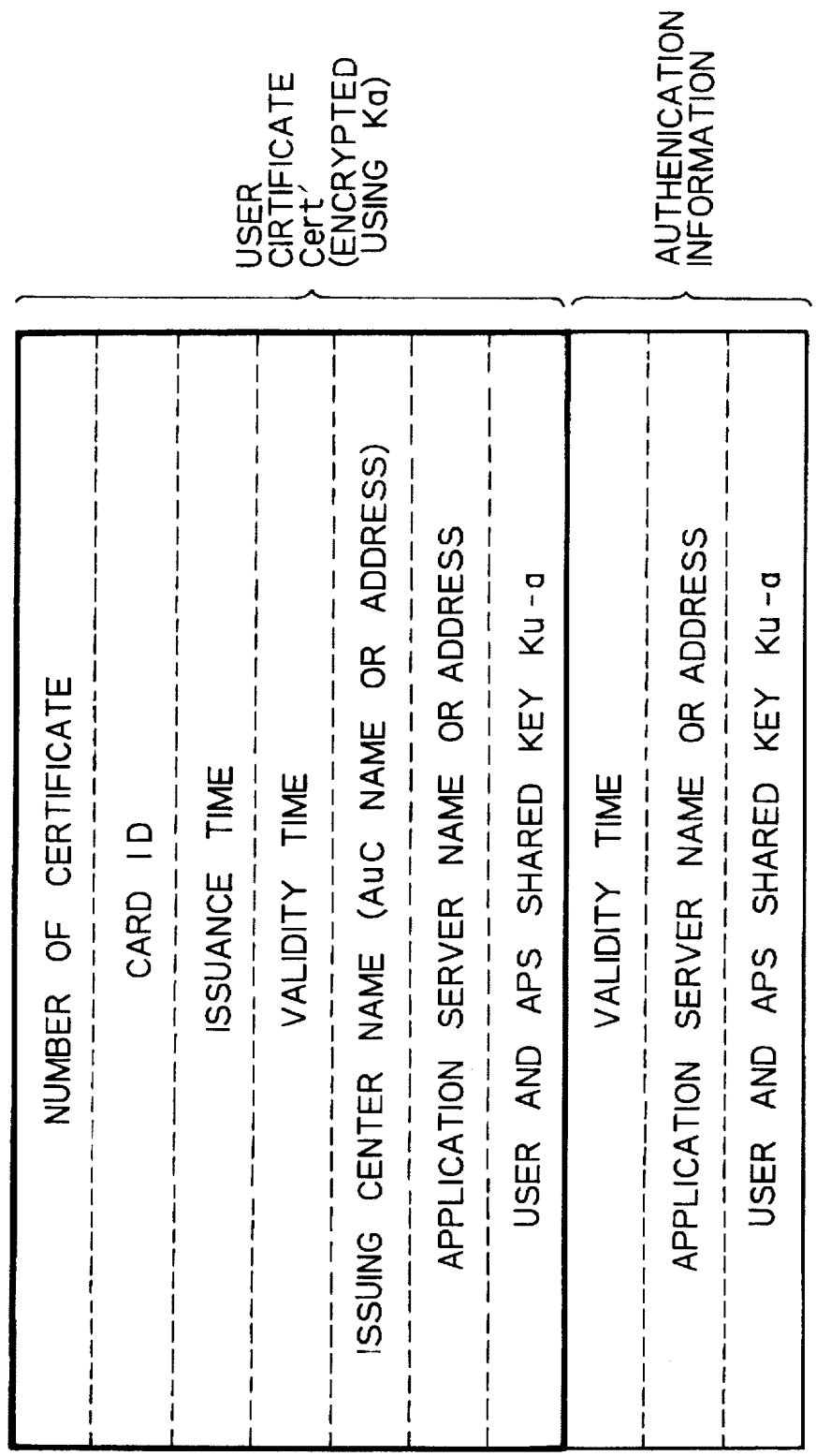
FIG. 11 is a sketch showing content of a certification used in the authentication processes in the embodiment shown in FIG. 6.

If the encrypted Res' coincides with Res, a user certificate Cert and an authentication information AuInfo are issued for the smart card 10. Contents of the issued user certificate Cert and authentication information AuInfo are indicated in FIG. 11 as an example.

In order to prevent from fraudulent, the user certificate Cert is encrypted using an APS secret key Ka which is shared only by the AuC 17 and the APS 16 corresponding to the application server name APS NAME, to produce Cert'. Namely, by using a cryptographic function f, Cert' is obtained from Cert'=f(Cert,Ka). The authentication information AuINfo and the encrypted user certificate Cert' are transmitted to the smart card 10 and stored therein. Since the encrypted user certificate Cert' cannot be analyzed at the user side, necessary items such as an expiring time are transmitted in duplicate.

Although the first phase in a challenge-response authentication scheme has been described in detail, an authentication system according to the present invention can be achieved by a mutual authentication scheme wherein the user side and the network side authenticate each other.

FIG. 9 illustrates procedure in the first phase in the mutual authentication mechanism. As shown in this figure, at first, an inherent card number IDu stored in this smart card 10 is read out and transmitted to the AuC 17 with a name of the application server APS NAME which will provide a desired network service as an authentication request. This transmission is represented by [IDu,APS NAME] in FIG. 9.

The AuC 17 generates a random number Rnd1 and transmits it to the smart card 10. The smart card 10 encrypts the received random number Rn'd1 using the user secret key Ku stored in its memory to generate a response Res1 by means of a function Res1=f(Rnd1,Ku). The smart card 10 also generates a random number Rnd2. The generated response Res1 and the random number Rnd2 are transmitted to the AuC 17.

The AuC 17 inquires the user secret key Ku from the received card number IDu using the database 17a, and then, executes the same encryption of the random number Rnd1 as done in the smart card 10 using the user secret key Ku to generate Res1' by means of a function Res1'=f(Rnd1,Ku). The generated Res1' is then compared with the response Res1 transmitted from the smart card 10. If the user is a legitimate user and the user secret key Ku is correct one, Res1 will coincides with Res1'. However, if the user secret key Ku is incorrect, the calculated results Res1 and Res1' will not coincide with each other. In this case, failure of the authentication is informed to the user side and the process is terminated.

If the encrypted Res1' coincides with Res1, following procedure for authenticating the AuC 17 by the smart card 10 is carried out. First, the AuC 17 encrypts the random number Rnd2 transmitted from the smart card 10 using the user secret key Ku to generate a response Res2, by means of a function Res2=f(Rnd2,Ku). Then, the AuC 17 issues a user certificate Cert and an authentication information AuInfo for the smart card 10. Contents of the issued user certificate Cert and authentication information AuInfo are indicated in FIG. 11 as an example.

In order to prevent from fraudulent, the user certificate Cert is encrypted using a APS secret key Ka which is shared only by the AuC 17 and the APS 16 corresponding to the application server name APS NAME, to produce Cert'. Namely, by using a cryptographic function f, Cert' is obtained from Cert'=f(Cert,Ka). The response Res2, the authentication information AuINfo and the encrypted user certificate Cert' are transmitted to the smart card 10. Since the encrypted user certificate Cert' cannot be analyzed at the user side, necessary items such as an expiring time are transmitted in duplicate. The smart card 10 executes the same encryption of the random number Rnd2 as done in the AuC 17 using the user secret key Ku to generate Res2' by means of a function Res2'=f(Rnd2,Ku). The generated Res2' is then compared with the response Res2 transmitted from the AuC 17. If the AuC is a legitimate authentication center, Res2 will coincides with Res2'. Therefore, in this case, the encrypted user certificate Cert' and the authentication information AuInfo are stored in the memory in the smart card 10. However, if the calculated results Res2 and Res2' do not coincide with each other, it is judged that the AuC 17 is not legitimate one and thus the authentication is failed. In this case, the issued user certificate Cert' and authentication information AuInfo are canceled.

In order to protect the authentication information AuInfo and the user certificate Cert' from being eavesdropped and fraudulently accessed by a third party when they are transmitted from the AuC 17 to the smart card 10, the authentication information AuInfo and the user certificate Cert' may be encrypted by a session key shared by the AuC 17 and the smart card 10. It is desired to produce a session key in accordance with the random numbers Rnd1 and Rnd2 and the user secret key Ku shared only by the AuC 17 and the smart card 10.

FIG. 8 illustrates procedure in the second phase for requesting and enjoying a network service. As shown in this figure, at first, the encrypted user certificate Cert' which has been stored in the smart card 10 is read out and transmitted to the application server 16. This transmission is represented by [Cert'] in FIG. 8. It should be noted that the user certificate Cert' can be issued only by the AuC 17 and can be evaluated only by the application server 16, and that not only the smart card 10 but also the client terminal 12 cannot analyze it.

The application server 16 decrypts the transmitted user certificate Cert' using its APS secret key Ka to extract the original user certificate Cert. Then, the application server 16 evaluates or verifies the user certificate Cert by checking known or estimative information such as application server name, issuance time or validity time period contained in the certificate Cert. For example, if the certificate Cert is forged one, no significant information can be extracted there from and thus analysis of the certificate Cert fails. Even if the certificate Cert is legitimate one, this certificate Cert may be dealt with invalid when the validity time is expired.

Since the user certificate Cert' encrypted by using the APS secret key Ka is transmitted through the network when the smart card 10 accesses to the application server 16, a fraudulent third party may copies the encrypted certificate Cert' and may use it by stealth. In order to prevent such fraudulent usage, a challenge-response authentication is also executed between the smart card 10 and the application server 16. Namely, the application server 16 generates a random number Rnd and transmits it to the smart card 10. The smart card 10 encrypts the received random number Rnd using the user and APS shared key Ku-a contained in the authentication information sent from the AuC 17 when the user certificate was issued, to generate a response Res by means of a function Res=f(Rnd,Ku-a). The generated response Res is transmitted to the application server 16.

The application server 16 executes the same encryption of the random number Rnd as done in the smart card 10 using the user and APS shared key Ku-a which was contained in the decrypted used certificate Cert to generate Res' by means of a function Res'=f(Rnd,Ku-a). The generated Res' is then compared with the response Res transmitted from the smart card 10. If the user is a legitimate user, Res will coincides with Res'. However, if the user is a fraudulent user, the calculated results Res and Res' will not coincide with each other. In this case, although the certificate Cert is correct, it may be used by stealth. Thus, failure of the authentication is informed to the user side and the process is terminated.

If the encrypted Res' coincides with Res, the authentication is succeeded and the network service requested by the user is provided to the client terminal 12.

The user and APS shared key Ku-a is contained in both the user certificate and the authentication information sent from the AuC 17 to the smart card 10 during the accessing procedure to the AuC 17, shown in FIGS. 7 and 9. This is also apparent from FIG. 11. Since the user certificate is decrypted only by the application server 16 having the APS secret key Ka and the authentication information is stored in the smart card 10 not stored in the application server 16, this user and APS shared key Ku-a is sent in duplicate. Even if a third party steals the user certificate encrypted by the APS secret key Ka, he cannot analyze it. Therefore, he cannot encrypt the random number Rnd by using the user and APS shared key Ku-a.

FIG. 10 illustrates procedure in the second phase in the mutual authentication mechanism. As shown in this figure, at first, at first, the encrypted user certificate Cert' which has been stored in the smart card 10 is read out and transmitted to the application server 16. This transmission is represented by [Cert'] in FIG. 10. It should be noted that the user certificate Cert' can be issued only by the AuC 17 and can be evaluated only by the application server 16, and that not only the smart card 10 but also the client terminal 12 cannot analyze it.

The application server 16 decrypts the transmitted user certificate Cert' using its APS secret key Ka to extract the original user certificate Cert. Then, the application server 16 evaluates or verifies the user certificate Cert by checking known or estimative information such as application server name, issuance time or validity time period contained in the certificate Cert. For example, if the certificate Cert is forged one, no significant information can be extracted there from and thus analysis of the certificate Cert fails. Even if the certificate Cert is legitimate one, this certificate Cert may be dealt with invalid when the validity time is expired.

Since the user certificate Cert' encrypted by using the APS secret key Ka is transmitted through the network when the smart card 10 accesses to the application server 16, a fraudulent third party may copies the encrypted certificate Cert' and may use it by stealth. In order to prevent such fraudulent usage, the mutual authentication is executed between the smart card 10 and the application server 16. Namely, the application server 16 generates a random number Rnd1 and transmits it to the smart card 10. The smart card 10 encrypts the received random number Rnd1 using the user and APS shared key Ku-a contained in the authentication information sent from the AuC 17 when the user certificate was issued, to generate a response Res by means of a function Res1=f(Rnd1,Ku-a). The smart card 10 also generates a random number Rnd2. The generated response Res1 and the random number Rnd2 are transmitted to the application server 16.

The application server 16 executes the same encryption of the random number Rnd as done in the smart card 10 using the user and APS shared key Ku-a which was contained in the decrypted used certificate Cert and extracted therefrom, to generate Res1' by means of a function Res1'=f(Rnd1,Ku-a). The generated Res1' is then compared with the response Res1 transmitted from the smart card 10. If the user is a legitimate user, Res1 will coincides with Res1'. However, if the user is a fraudulent user, the calculated results Res1 and Res1' will not coincide with each other. In this case, although the certificate Cert is correct, it may be used by stealth. Thus, failure of the authentication is informed to the user side and the process is terminated.

If the encrypted Res1' coincides with Res1, following procedure for authenticating the application server 16 by the smart card 10 is carried out. First, the application server 16 encrypts the random number Rnd2 transmitted from the smart card 10 using the user and APS shared key Ku-a to generate a response Res2 by means of a function Res2=f (Rnd2,Ku-a). Then, the generated Res2 is transmitted to the smart card 10.

The smart card 10 executes the same encryption of the random number Rnd2 as done in the application server 16 using the user and APS shared key Ku-a to generate Res2' by means of a function Res2'=f(Rnd2,Ku-a). The generated Res2' is then compared with the response Res2 transmitted from the application server 16. If the application server is a legitimate one, Res2 will coincides with Res2'. However, if the application server is an incorrect one, the calculated results Res2 and Res2' will not coincide with each other. In this case, failure of the authentication is informed to the user and the process is terminated.

If the encrypted Res2' coincides with Res2, the mutual authentication is succeeded and the network service requested by the user is provided to the client terminal 12.

In this second embodiment, it is important that the user certificate which can be used for one or more times is securely stored without being stolen by a third party. For this purpose, it is effective to execute cryptographic function within an IC card provided with a CPU (smart card) which can subjectively manage accesses and to store a user certificate in the card.

As is described in detail, according to the present invention, an authentication system adopting an authentication scheme for verifying a user from a network, by sharing the same secret key between the user and the network, encrypting a known information using the secret key at the user to produce first encrypted information, transmitting the first encrypted information from the user to the network, encrypting the known information using the secret key at the network to produce second encrypted information, and collating the transmitted first encrypted information with the produced second encrypted information at the network, has system comprising a single master authentication center arranged in the network, the master authentication center sharing with the user a user secret key, and a plurality of slave authentication centers sharing with the master authentication center respective secret keys different from the user secret key. The master authentication center authenticates the user by using the user secret key and issues a certificate information which certifies legitimation of the user, to the user if the user is authenticated as a legitimate user. The slave authentication center authenticates the certificate information from the user and issues a permission information which allows an access to a specified server or an application server in the network, to the user if the user is authenticated as a legitimate user.

Therefore, in case of verifying a user by presenting a calculation result of the user's inherent information, authentication processes can be executed by distributed servers in the network without sharing user's secret information. In other words, according to the present invention, by using a user certificate which is valid for a predetermined period or predetermined times, authentication processes can be executed by distributed servers in the network without sharing user's secret information. A part of authentication load can be shared by application servers instead of slave authentication centers.

In near future, decisions or purchases and sales via a wide range network such as Internet or CATV network will greatly increase, and therefore requests of user authentications via a plurality of networks or within a single network will extremely increase. According to the present invention, a very effective authentication system can be provided under these circumstances.

Many widely different embodiments of the present invention may be constructed without departing from the spirit and scope of the present invention. It should be understood that the present invention is not limited to the specific embodiments described in the specification, except as defined in the appended claims.

We claim:

1. An authentication system adopting an authentication scheme for verifying a user from a network, by sharing the same secret key between the user and the network, encrypting a known information using said secret key at the user to produce first encrypted information, transmitting the first encrypted information from the user to the network, encrypting the known information using said secret key at the network to produce second encrypted information, and collating the transmitted first encrypted information with the produced second encrypted information at the network, said system comprising a single master authentication center arranged in the network, said master authentication center sharing with the user a user secret key, and a plurality of slave authentication centers sharing with said master authentication center respective secret keys different from the user secret key, said master authentication center authenticating the user by using said user secret key and issuing a certificate information to the user if the user is authenticated as a legitimate user, said certificate information certifying legitmation of the user, said slave authentication center authenticating the certificate information from the user and issuing a permission information which allows an access to a specified server or an application server in the network, to the user if the user is authenticated as a legitimate user, wherein said user has an IC card provided with a CPU, and wherein the IC card executes management of said user secret key and encryption and decryption of the information.

2. The authentication system as claimed in claim 1, wherein said system adopts a mutual authentication scheme for further verifying the network from the user, by encrypting a known information using said secret key at the network to produce third encrypted information, transmitting the third encrypted information from the network to the user, encrypting the known information using said secret key at the user to produce fourth encrypted information, and collating the transmitted third encrypted information with the produced fourth encrypted information at the user.

3. The authentication system as claimed in claim 1, wherein said secret key used for encrypting the known information is one using a random number generated at the user.

4. An authentication system adopting an authentication scheme for verifying a user from a network, by sharing the same secret key between the user and the network, encrypting a known information using said secret key at the user to produce first encrypted information, transmitting the first encrypted information from the user to the network, encrypting the known information using said secret key at the network to produce second encrypted information, and collating the transmitted first encrypted information with the produced second encrypted information at the network, said network issuing a certificate information to the user if the user is authenticated as a legitimate user, said certificate information certifying legitimation of the user and being valid within a predetermined period or predetermined times, wherein said user has an IC card provided with a CPU, and wherein the IC card executes management of said user secret key, management of the certificate information issued at the network, and encryption and decryption of the information.

5. The authentication system as claimed in claim 4, wherein said system adopts a mutual authentication scheme for further verifying the network from the user, by encrypting a known information using said secret key at the network to produce third encrypted information, transmitting the third encrypted information from the network to the user, encrypting the known information using said secret key at the user to produce fourth encrypted information, and collating the transmitted third encrypted information with the produced fourth encrypted information at the user.

* * * * *